(12) United States Patent
Brand

(10) Patent No.: US 9,715,507 B2
(45) Date of Patent: Jul. 25, 2017

(54) TECHNIQUES FOR RECONCILING METADATA AND DATA IN A CLOUD STORAGE SYSTEM WITHOUT SERVICE INTERRUPTION

(71) Applicant: CTERA Networks, Ltd., Petach-Tikva (IL)

(72) Inventor: Aron Brand, Petach-Tikva (IL)

(73) Assignee: CTERA Networks, Ltd., Petach-Tikva (IL)

( * ) Notice: Subject to any disclaimer, the term of this patent is extended or adjusted under 35 U.S.C. 154(b) by 258 days.

(21) Appl. No.: 14/227,078

(22) Filed: Mar. 27, 2014

(65) Prior Publication Data

US 2014/0297604 A1    Oct. 2, 2014

Related U.S. Application Data

(60) Provisional application No. 61/806,154, filed on Mar. 28, 2013.

(51) Int. Cl.
*G06F 17/30*     (2006.01)

(52) U.S. Cl.
CPC .............. *G06F 17/30194* (2013.01)

(58) Field of Classification Search
USPC ................................ 707/692, 769
See application file for complete search history.

(56) References Cited

U.S. PATENT DOCUMENTS

| | | | |
|---|---|---|---|
| 7,620,887 B1 * | 11/2009 | Lubbers | G06F 11/3692 715/205 |
| 8,612,382 B1 * | 12/2013 | Patel | G06F 11/0727 707/609 |
| 8,671,108 B2 * | 3/2014 | Kondasani | G06F 17/3089 707/769 |
| 8,706,994 B2 | 4/2014 | Akirav et al. | |
| 2006/0129614 A1 * | 6/2006 | Kim | G06F 11/1435 |
| 2009/0037431 A1 * | 2/2009 | Martino | G06F 17/30893 |
| 2013/0031546 A1 * | 1/2013 | Agarwal | G06F 9/5072 718/1 |
| 2013/0055100 A1 * | 2/2013 | Kondasani | G06F 17/30887 715/739 |
| 2013/0060805 A1 * | 3/2013 | Kondasani | G06F 17/3089 707/769 |
| 2013/0138607 A1 | 5/2013 | Bashyam et al. | |
| 2014/0181633 A1 * | 6/2014 | Mo | G06F 17/2247 715/234 |

* cited by examiner

*Primary Examiner* — Cam-Linh Nguyen
(74) *Attorney, Agent, or Firm* — M&B IP Analysts, LLC

(57) ABSTRACT

A system and methods for reconciling data and metadata in a cloud storage system while the cloud storage system is fully operational are provided. The method comprises scanning for broken references in a metadata database containing metadata of blocks stored in the cloud storage system, wherein the scanning for the broken references is performed as a background process; and synchronously verifying blocks for at least existence of the blocks in the object storage system, wherein the synchronous block verification is performed using a foreground process as blocks are requested.

33 Claims, 10 Drawing Sheets

TECHNIQUES FOR RECONCILING METADATA AND DATA IN A CLOUD STORAGE SYSTEM WITHOUT SERVICE INTERRUPTION

CROSS-REFERENCE TO RELATED APPLICATIONS

This application claims the benefit of U.S. Provisional Application No. 61/806,154 filed on Mar. 28, 2013, the contents of which are hereby incorporated by reference.

TECHNICAL FIELD

The invention generally relates to network devices that are integrated with cloud services, and more particularly to techniques for reconciling metadata and data in a cloud storage system.

BACKGROUND

The demand for data storage has been rapidly escalating because as the amount of data such as digital media stored by users grows, so does their need to store digital media reliably over extended periods of time. Traditional backup solutions periodically copy data to, for example, backup tapes, compact discs (CDs), or other local storage media. However, such solutions are not optimal because the backup media is stored in a single location, and the media being used for backup has typically been prone to failure.

Commercially available services that are referred to as cloud storage services (CSS) provide mass storage through a web service interface available through the Internet. The storage infrastructure includes a distributed array of geographically distributed data centers connected to a plurality of clients through a wide area network (WAN). A data center typically consists of servers and mass storage to facilitate cloud storage services to the clients. Such services enable applications including, for example, backup and restore of data, data synchronization, file sharing, and so on.

Cloud storage services are accessible to users from anywhere in the world, through a client implementing a web services' interface designed to at least synchronize data with the data centers. However, such web services fail to provide standard file sharing protocols (e.g., common internet file system (CIFS) or network file system (NFS)). In addition, accessing files stored in the cloud storage from the LAN is typically many times slower than accessing files on the same LAN that are simply stored in local storage devices.

FIG. 1 shows an exemplary diagram illustrating an infrastructure of a cloud storage service (CSS) 100 according to existing solutions. The CSS 100 includes a metadata database (MDB) 110, application servers 120, an object storage system 130, a client 140, and a scanner 150. A client 140 accessing the CSS communicates with one or more application servers 120. The client 140 may be a storage appliance that provides an access cloud storage service and enables storing locally saved data in the cloud storage service.

An object storage system 130 is a system of a cloud storage provider. The object storage system 130 includes a plurality of object storage devices. An object storage device (OSD) is a computer storage device that organizes data into flexible-sized data containers, called objects, instead of providing a block-oriented interface that merely reads and writes fixed-sized blocks of data. Each object saved in the object storage system 130 is identified by an object identifier (OID), which typically is then used to retrieve data from the system 130. Although not illustrated in FIG. 1, a plurality of object storage systems 130 may be included in the CSS 100, each of which belongs to a different storage provider, and which may or may not be co-located with the MDB 110. Furthermore, the CSS 100 may include other non-object storage systems such as file servers.

When a file is saved in the CSS 100, it is typically split into a number of data blocks, which may be of fixed or of variable size. A filemap is saved as an object of the object storage system 130. The filemap includes a list of block codes needed for later reconstruction of a split file. The data blocks are saved as objects (either one block per object, or multiple blocks per object) in the object storage system 130, while metadata of each block is kept in the MDB 110. The metadata may include a block size, a reference count, a Block Code, and an object ID (OID). The OID is the block's location in the system 130, while the Block Code is derived from the block contents by means of a one way hash function. A reference count is a parameter that maintains the number of file maps which reference the data block. Each data block has its own reference count value saved in the MDB 110. Therefore, maintaining a correct MDB 110 is required for data persistency and to avoid data corruption.

However, in certain instances, the MDB 110 may maintain incorrect information and pointers to data blocks stored in the storage system 130. That is, in such instances, the MDB 110 and the system 130 are out of synchronization. This may occur when, for example, the MDB 110 is recovered from a backup to an earlier version, when one of the object storage devices in the storage system 130 is restored from a backup to an earlier version, or when an object loss occurs in the system 130 due to a technical malfunction.

A MDB 110 being out of synchronization may result in a few problems including, for example, broken references, orphan objects, and an incorrect reference count. The broken references are blocks that are designated in the metadata contents saved in the MDB 110, but that do not exist in the system 130. Broken references cause data corruption. For example, a block A with a broken reference will be reported to the client 140 as if it is already saved in the CSS 100. Therefore, the client 140, when uploading a file which should contain block A, would in reality upload the file to the CSS 110 without block A. Thus, the new file would be stored with a missing block (block A) and yet the write operation would still be considered successful, thereby causing a silent corruption of data.

An orphan object is an object of a respective data block saved in the system 130, but without corresponding metadata and/or pointers in the MDB 110. Orphan objects result in a waste of storage space, as such objects cannot be accessed by the client 140. Likewise, an incorrect reference count value, which may result from a broken reference, causes a resource leak, as data blocks cannot be deleted from the storage system 130.

In summary, a MDB 110 being out of synchronization can significantly degrade the performance of the CSS 100 and cause data corruption as well as waste of storage resources. Therefore, a critical mission in the CSS 100 is to re-synchronize (or reconcile) the MDB 110 with the object storage system 130.

A prior art solution for reconciling of a MDB is to completely list the contents of an object storage device in the system 130 while comparing the listing with the contents of MDB 110 to identify broken references, orphan objects, and incorrect reference counts. The MDB 110 must be taken off-line until the scanning is completed; otherwise, new silent data corruption may occur as described above. That is, data blocks cannot be saved or retrieved from the CSS 100. This process usually requires a prolonged time (e.g., hours or days) until completion, thereby causing a lengthy service disruption. The reconciliation of the MDB 110, as performed by prior art techniques, is carried out by scanner 140. The scanner 140 is communicatively connected to the object storage system 130 and the MDB 110.

It would be therefore advantageous to provide an efficient solution for reconciling of the MDB which does not require stalling the operation of the CSS.

SUMMARY

Certain exemplary embodiments disclosed herein include a method for reconciling data and metadata in a cloud storage system while the cloud storage system is fully operational. The method includes scanning for broken references in a metadata database containing metadata of objects stored in the cloud storage system, wherein the scanning for the broken references is performed as a background process; and synchronously verifying blocks for at least existence of the blocks in the object storage system, wherein the synchronous block verification is performed using a foreground process as blocks are requested.

Certain exemplary embodiments disclosed herein further include a reconciling data and metadata in a cloud storage system while the cloud storage system is fully operational. The system includes a processor communicatively connected to a resource storage; and a memory coupled to the processor, wherein the memory contains instructions that, when executed by the processor, configure the system to: scan for broken references in a metadata database containing metadata of objects stored in the cloud storage system, wherein the scanning for the broken references is performed as a background process; and synchronously verify blocks for at least existence of the blocks in the object storage system, wherein the synchronous block verification is performed using a foreground process as blocks are requested.

Certain exemplary embodiments disclosed herein further include a method for reconciling data and metadata in a cloud storage system while the cloud storage system is fully operational. The method includes recalculating reference counts of objects referenced in the metadata database, wherein recalculating for the reference counts is performed as a background process; and synchronously verifying blocks for at least existence of the blocks in the object storage system, wherein the synchronous block verification is performed using a foreground process as blocks are requested.

Certain exemplary embodiments disclosed herein further include a reconciling data and metadata in a cloud storage system while the cloud storage system is fully operational. The method comprises scanning for orphan objects in the cloud storage system, wherein scanning for the orphan objects is performed as a background process; and synchronously verifying blocks for at least existence of the blocks in the object storage system, wherein the synchronous block verification is performed using a foreground process as blocks are requested.

BRIEF DESCRIPTION OF THE DRAWINGS

The subject matter disclosed herein is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION

Figure 1:
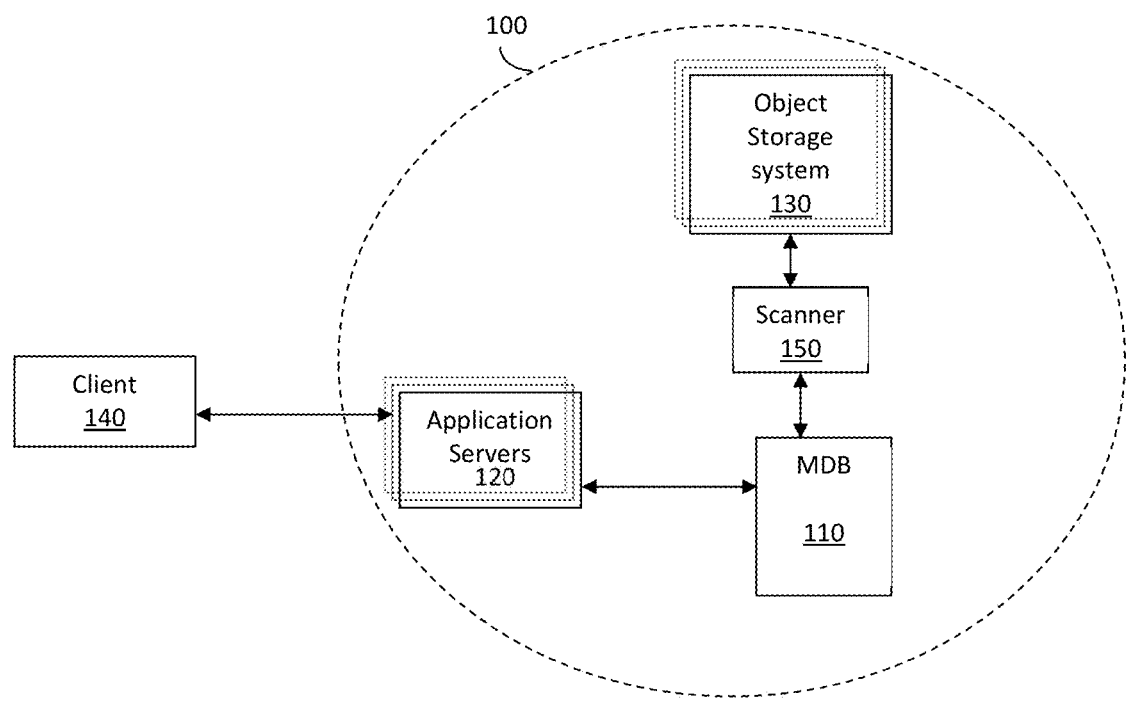
FIG. 1 is a diagram illustrating the infrastructure of a cloud storage service (CSS).

It is important to note that the embodiments disclosed are only examples of the many advantageous uses of the innovative teachings herein. In general, statements made in the specification of the present disclosure do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various embodiments disclosed herein include techniques for reconciliation of metadata in a metadata database (MDB) and objects stored in a cloud storage system, without service interruption. The disclosed techniques allow scanning of the MDB in the background, namely, when the CSS is fully operative and can be accessed. Objects are the items stored in the object storage system. Blocks are the items stores in the metadata database. Each block has an associated object in the object storage system (which may be missing). In some embodiments, several blocks may be associated with a single object.

According to the disclosed embodiments, the verification of the MDB is performed in two parallel processes by a background task and in real-time, by a demand driven task. To this end, the scan of the MDB is performed in the background. However, when an immediate action should be taken, a specific object is synchronously verified in the foreground. Such an immediate action may be, for example, in response to a request to check the validity and existence of some blocks which were not yet verified. The scanning state is periodically stored as a set of block ID ranges only.

As an example, an immediate verification action ("synchronous verification") is required when the existence of a specific set of blocks should be determined. This may be performed during a backup process of data from a cloud-enabled device to the CSS. An example for such a backup process is described in the Co-Pending patent applicant Ser. No. 12/641,559 entitled "STORAGE DEVICE AND METHOD THEREOF FOR INTEGRATING NETWORK ATTACHED STORAGE WITH CLOUD STORAGE SERVICES," assigned to the common assignee and the contents of which are herein incorporated by reference. The disclosed embodiments will be described with reference to the CSS 100 illustrated in FIG. 1. However, it should be appreciated that the scanner 150 is adapted to perform the reconciliation techniques disclosed herein. Furthermore, the scanner 150 implementing the disclosed techniques can be implemented in one or more application servers (e.g., application servers 120) or in one or more cloud connectors (e.g., cloud connectors 130) (discussed below). In addition, the scanner 150 may be realized as a plurality of instances configured to perform the disclosed embodiments.

As noted above, the MDB 110 is configured to maintain metadata for each object stored in the object storage system 130. According to one embodiment, the metadata for each object may include a block code, a storage node ID in the system 130, an object ID (OID), a monotonically block ID, and a status field. A block code is a unique identifier for the block derived from its content via a hashing function, and the block ID is a unique identifier assigned to an object corresponding to a data block stored in the system 130.

The OID is assigned by the system 130 and serves as a pointer for subsequent retrieval of the object from the system 130. It should be noted that each cloud storage provider may use a different form for an OID. The block ID is an automatically incrementing record number guaranteed to be monotonically increased every time a specified event occurs.

The status field is configured to determine an existence status for the respective block. In an exemplary embodiment, the status field is color-coded with two possible values, white and black. In that embodiment, a white status may determine that there is a valid reference to the block in the MDB 110. A black status may be determined when the block is missing or corrupted. The status field is updated during the scanning of the MDB. It should be noted that following loss of synchronization between the object storage and the metadata, the status field may become incorrect and needs to be reconciled based on the actual contents of the object storage.

The MDB 110 may also contain a file table containing the metadata of all the files saved by the clients. Each file has a file status (e.g., black/white), and the Block Code of the file's filemap. A filemap is a special object, also stored in the object storage system 130, which describes how to reconstruct a file, by including the sequence of Block Codes of all the blocks of which the file consists. It should be noted that the block ID is stored along with the block metadata in the MDB 110 and is different than the block code. The block code may be derived from the block contents using a hash function.

According to an exemplary embodiment, unverified blocks that still require verification are flagged (or marked) with a gray status, while corrupt or missing blocks are flagged with a black status. In that embodiment, verified and operable blocks are flagged with a white status. In addition, file-maps that are unverified and which need to be verified are flagged with a gray status, while filemaps that are known to be corrupted or reference non-existing objects are flagged with a black status. Filemaps that are verified are flagged with a white status.

Figure 2:
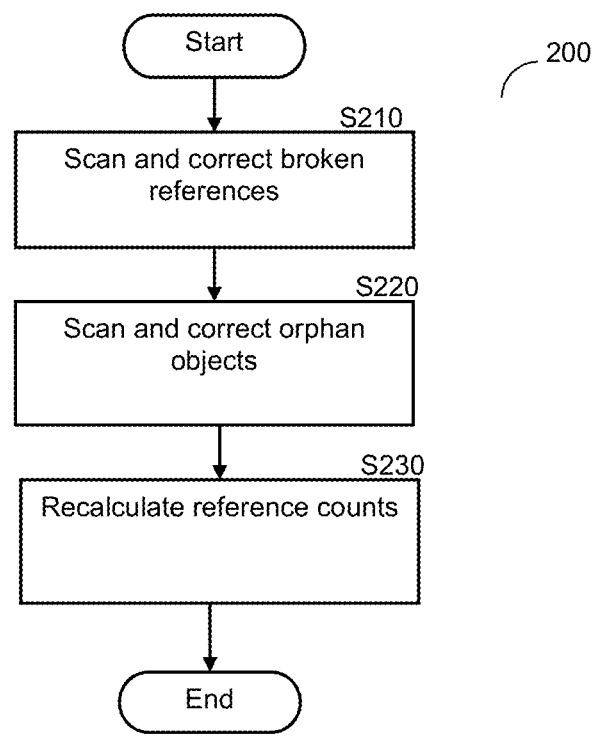
FIG. 2 is a flowchart describing a method for re-synchronization of a metadata database (MDB) according to one embodiment.

FIG. 2 shows an exemplary and non-limiting flowchart 200 illustrating a method for reconciling a metadata DB (MDB) according to one embodiment. The method identifies and corrects at least the problems identified above that occur when the MDB 110 is out of synchronization. These problems include at least broken references, an incorrect reference count, and orphan objects. The reconciling process may be triggered manually by a command of the system administrator. Alternatively, the process may start automatically at a predefined schedule or when an "out of sync" condition is detected.

At S210, a scanning process for detecting broken references is performed. According to one embodiment, S210 includes scanning, in the background, all blocks in the MDB 110 that are flagged for scanning with a gray status.

Each flagged block is verified to determine if the block has a broken reference, i.e., the object with the OID does not exist. The block verification procedure includes reading the object from the object storage system 130, computing a hash value for the object read from the system 130, and matching the computed hash value to the value stored in the blocks' metadata in the MDB 110. If the hash values do not match or the object could not be found in the system 130, the status field may be changed to black; otherwise, if the hash values match, the status field may be changed to white. In another embodiment, the verification procedure includes querying the object storage system 130 to determine whether an object with the given OID exists, and does not verify the block data itself.

In another embodiment, to verity a filemap, the filemap is read, and all the blocks designated in the filemap which are flagged with a 'gray' status are iteratively verified. Verification may be performed as described above, where the status field of the block is changed to either 'black' or 'white'. Furthermore, if at least one block in the filemap has a 'black' status, then the filemap may be marked as 'black'.

It is further checked if the filemap is marked as 'black'. If so, the MDB 110 is searched to find all the files that reference this filemap, and those files are marked as 'black'. On the client's next synchronization, the list of files marked as 'black' is sent to the client (140). In response, the client may upload the missing blocks of these files again to the CSS 100, resulting in the files returning to white status. If the object containing the filemap was not found, the MDB 110 is marked as containing inaccurate reference counts.

According to one embodiment, when a gray block is encountered during the synchronous verification, S210 involves synchronously verification of those blocks prior to returning the list of missing Block Hash IDs to the client. This enables the CSS 100 to operate normally and without potential for data corruption.

In another embodiment, when a gray block is encountered during the synchronous verification, the CSS 100 speculatively responds to the client 140 that the CSS does have such a block. Then, a background verification task is scheduled in the background for blocks requested by the client and having a gray status. When the client completes uploading the file, an application server 120 waits for background verification task to be completed, before acknowledging that the file has been stored successfully. If a verification of any block fails, the server 120 is configured to instruct the client to retry uploading the missing blocks.

Figure 3A:
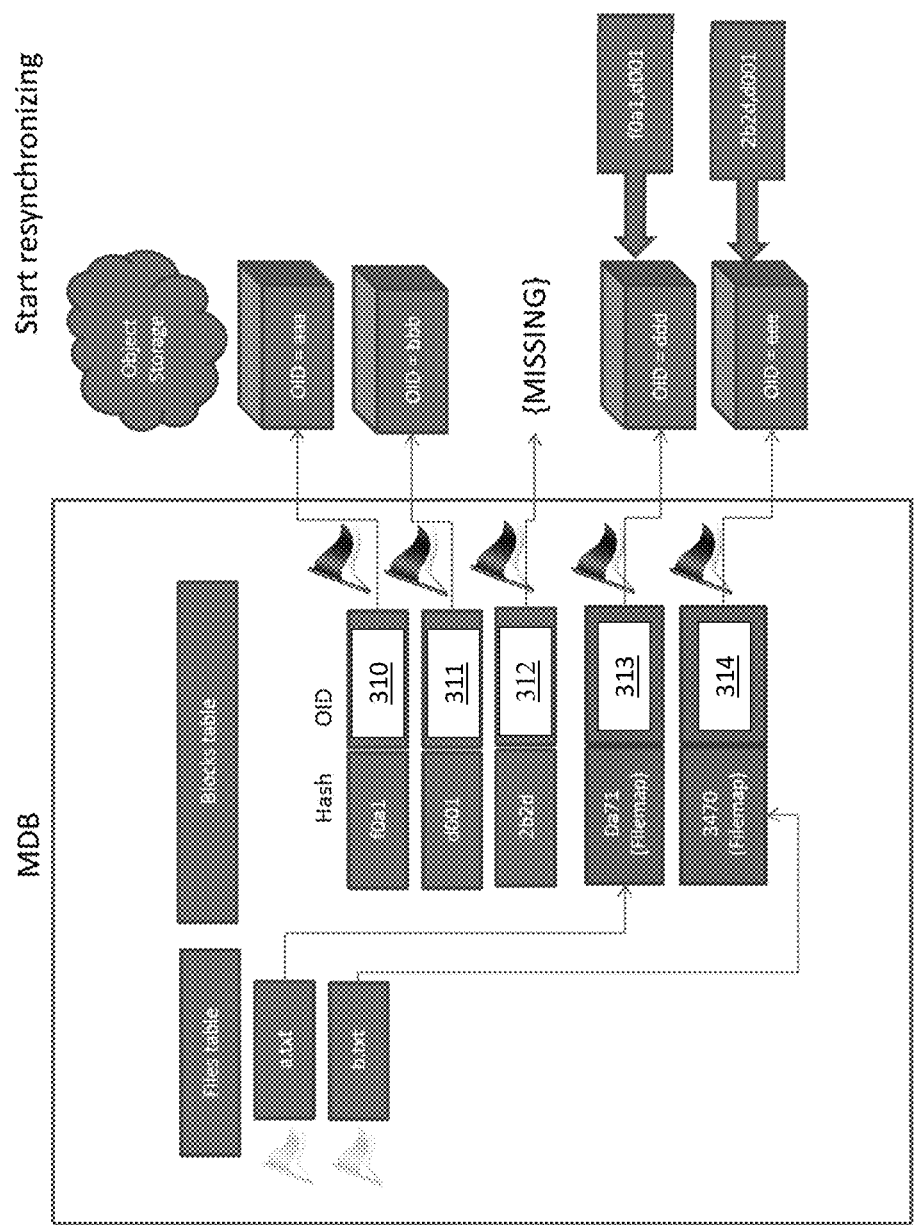
FIGS. 3A-3C illustrate the blocks' verification process according to one embodiment.
Figure 3B:
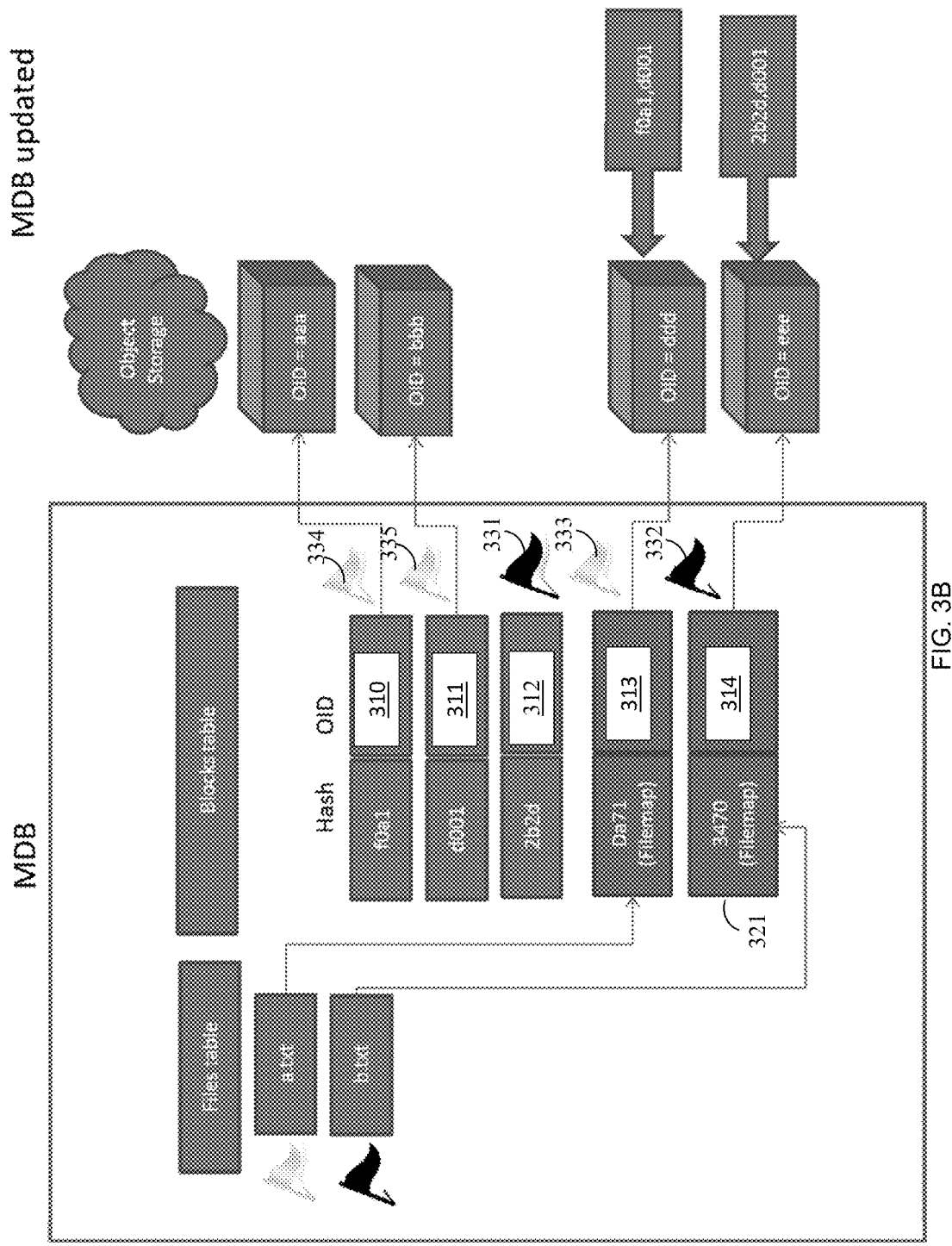
Figure 3C:
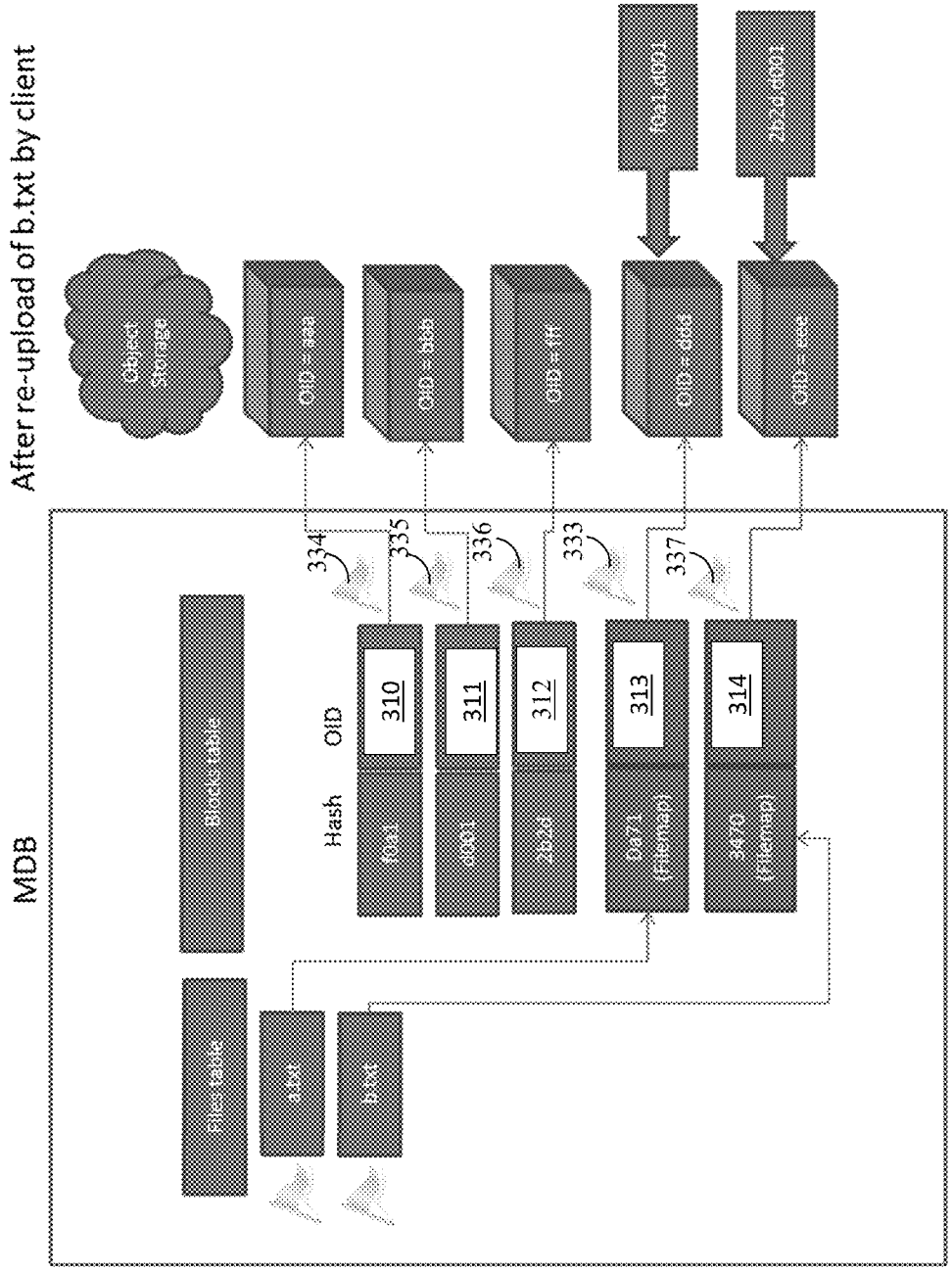

FIGS. 3A, 3B, and 3C provide a non-limiting example for the verification procedure discussed in S210. In FIG. 3A, block 310 through 314 are flagged with a 'gray' status, i.e., require reconciliation. In FIG. 3B, it is detected that a block 312 (having hash values '2b2d') and one filemap 321 references this missing object (the filemap having a value '3470') are missing. These blocks are flagged with 'black' flags 331 and 332, and the blocks 310, 311, and 312 are flag with 'white' flags 333, 334, and 335. In FIG. 3C, the missing blocks are uploaded by the client, which causes updating the MDB by at least marking all blocks using 'white' flags 333, 334, 335, 336 and 337. Other embodiments for carrying out S210 are discussed below with reference to FIGS. 4 and 5.

Referring back to FIG. 2, at S220, a scanning process for detecting orphan objects is performed. This scanning process also runs in the background while the CSS 100 is fully operational. In one embodiment, the S220 includes retrieving a list of OIDs from the system 130. In that embodiment, the list of OIDs is matched to the OIDs included in the metadata saved in the MDB 110. All objects of OIDs that are not found in the MDB 110 are declared as orphan objects. To reclaim the wasted space in CSS 100, such orphan objects are deleted from the object storage system 130. Other exemplary embodiments for carrying out S220 are discussed below with reference to FIGS. 6 and 7.

At S230, a process for recalculating the reference counts is performed. As noted above, when a filemap is lost (as detected at S210), there is no information as to which blocks the lost filemap pointed to. Consequently, the reference count cannot be updated to reflect this. As a result, according to one embodiment, all the reference counts are recalculated. In one embodiment, S230 is triggered only when a special tag is created during the scanning process performed at S210.

To recalculate the reference counts while the CSS 100 is operational, the following steps take place. First, a cleaner process, which removes objects having a reference count=0 is disabled. An exclusivity lock on the blocks table in the MDB 110 is then performed. This lock prevents the blocks table from being modified by other users while the lock is active. Next, all the reference counts are updated to 0. A temporary object table is created and a list of all filemaps is copied into the temporary table. This step is required when the CSS is operational, if new filemaps are created, because the counting of such additional files may result in a wrong reference count. Thereafter, the exclusivity lock is unlocked. Finally, all the filemaps that are listed in the temporary table are read, and for each object referenced by the filemap, its respective reference count in the MDB is increased. When finished, the cleaner process is re-enabled.

It should be noted that the S210, S220 and S230 are independent of each other. Specifically, one or more of S210, S220 and S230 can be carried out in a parallel fashion, a pipelined fashion, or a sequential flow.

Figure 4:
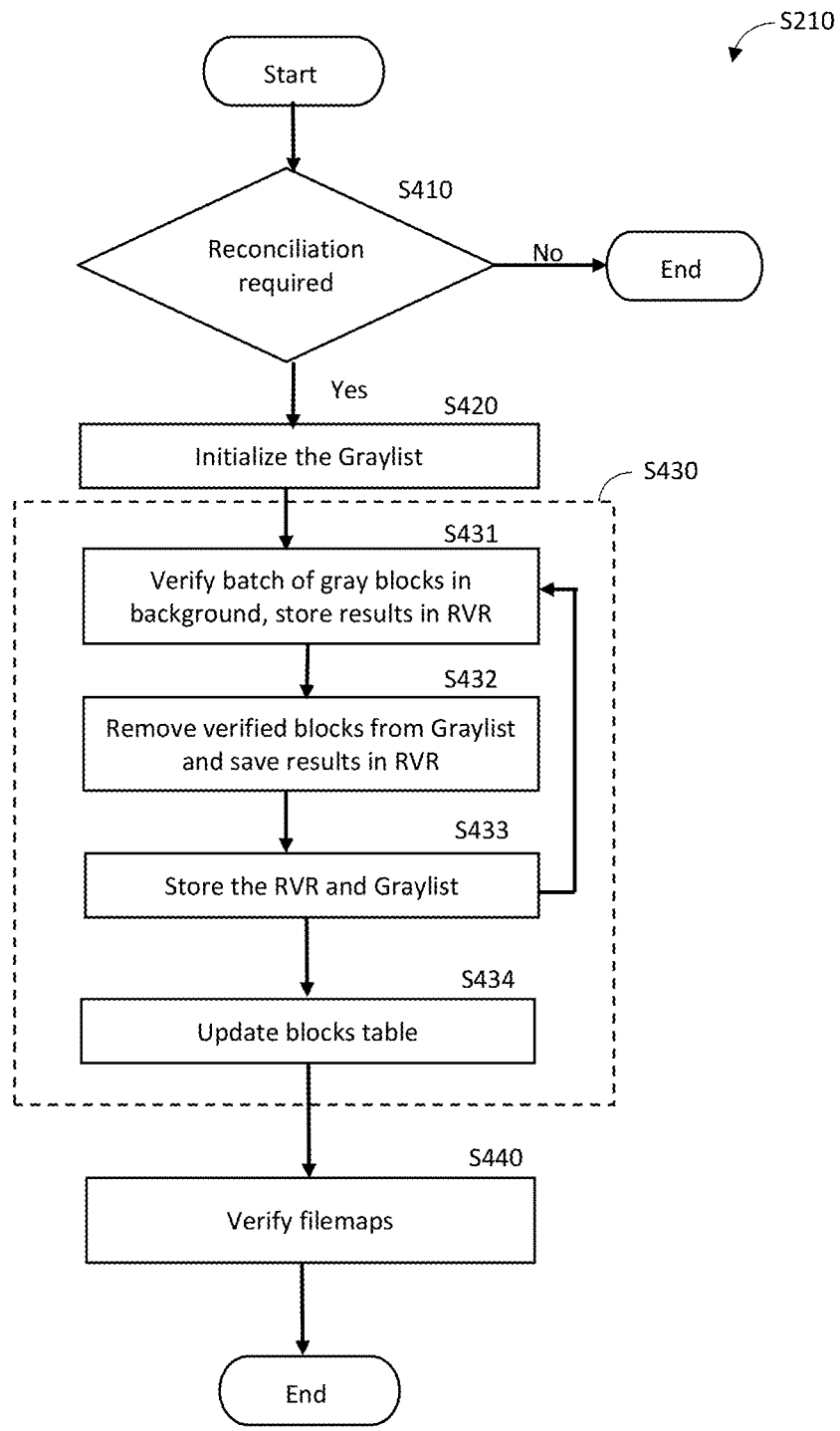
FIG. 4 is a flowchart illustrating a scanning process for broken references according to another embodiment.

FIG. 4 shows an exemplary and non-limiting flowchart illustrating the block verification process performed during the scanning from broken reference of S210 according to another embodiment. In this embodiment, rather than storing a "gray" value for blocks with unknown status in the blocks table, a compact representation of the set of gray block IDs (hereinafter the "Graylist") is kept in the memory of one or more of the application servers and/or dedicated server. In an exemplary implementation, the Graylist is a single scalar value (cursor), which stores the highest block ID that is known to be unverified (i.e., all the block IDs in the range from 0 to the scalar value 'cursor' are unverified). Alternatively, the Graylist is implemented as a compact set of block ID ranges, for example, by using a data structure such as, but not limited to, an interval tree.

At S410, it is checked if the Graylist is empty to determine if the objects' reconciliation is required. If so, execution ends as all objected are considered verified; otherwise, execution continues with S420 to initiate the blocks' reconciliation process. The reconciliation may be required, for example, due to some detected mismatch between the contents of the cloud storage and the MDB 110, or by a request issued by a system administrator. As discussed herein, a background scanning process is performed to scan the blocks table of the MDB 110 in some order, and verify the status of each of the objects in the object storage system 130.

At S420, the Graylist is initialized to contain the range from 0 to the maximal block ID in the MDB 110.

At S430, an object verification procedure is performed. In an embodiment, S430 includes reading an object from the object storage system 130, computing a hash value for the object read from the system 130, and matching the computed hash value to the value stored in the metadata in the MDB 110. In another embodiment, the verification procedure includes querying the object storage system 130 as to whether an object with the given OID exists, and does not involve verifying the block data itself.

Specifically, at S431, batches of objects designated in the Graylist may be iteratively verified. In one embodiment, the verification requires scanning the MDB 110 in a strictly descending order of block IDs. In that embodiment, any object with a block ID greater than or equal to the 'cursor' value is determined to be verified. It should be noted that a new object created after the scan has started is considered valid. Any object with a block ID smaller than the cursor value is considered to be in an unknown state ("gray").

In another embodiment, the verification of S431 is not executed in a strictly descending order; rather, in that embodiment, the scanning can be performed in any order, preferably by scanning batches of blocks in series in large consecutive block ID ranges. In this embodiment, specific blocks, and their respective block IDs can be selectively removed from the Graylist, thereby skipping verification and scanning of such objects. For example, for any object that has been successfully read by another process, its respective block ID can be removed from the Graylist. According to this embodiment, multiple scanning processes can run concurrently, each operating on separate and disjointed block ID ranges, thus improving scanning performance.

At S432, every object being verified is removed from the Graylist, and the verification results (e.g., White or Black) are kept in a recent verifications results (RVR) buffer.

At S433, the Graylist and RVR are periodically saved in persistent storage to, for example, the MDB to allow the background scanning process to resume without losing too much work, in case it was abnormally interrupted.

Furthermore, if there are multiple application servers 120 in the CSS, the Graylist may be periodically distributed to all the application servers. The servers may utilize a recent copy of the Graylist during a real time synchronous process, described further below. In another embodiment, the Graylist is periodically read from the MDB, and locally cached, by the servers 120.

At S434, the blocks table's status column in the MDB 110 is updated with information from the RVR, and then the RVR may be cleared. The updates may be performed periodically. At the conclusion of S434, the status column of the blocks table is reconciled. As a result, the blocks table contains accurate and dependable information regarding the status of blocks (i.e., whether blocks should be coded in black or white) is contained therein.

At S440, another verification procedure is performed during which filemaps are read and verified to ensure that they do not point to nonexistent or missing objects. The verification of S440 utilizes the status column of the blocks table, which is known to contain accurate information following the completion of S430. The filemap verification procedure also uses the Graylist and RVR for keeping track of which filemaps remain to be verified, and for periodically saving the results to persistent storage. S440 will be described in greater detail herein below with respect to the exemplary and non-limiting flowchart shown in FIG. 5.

Figure 5:
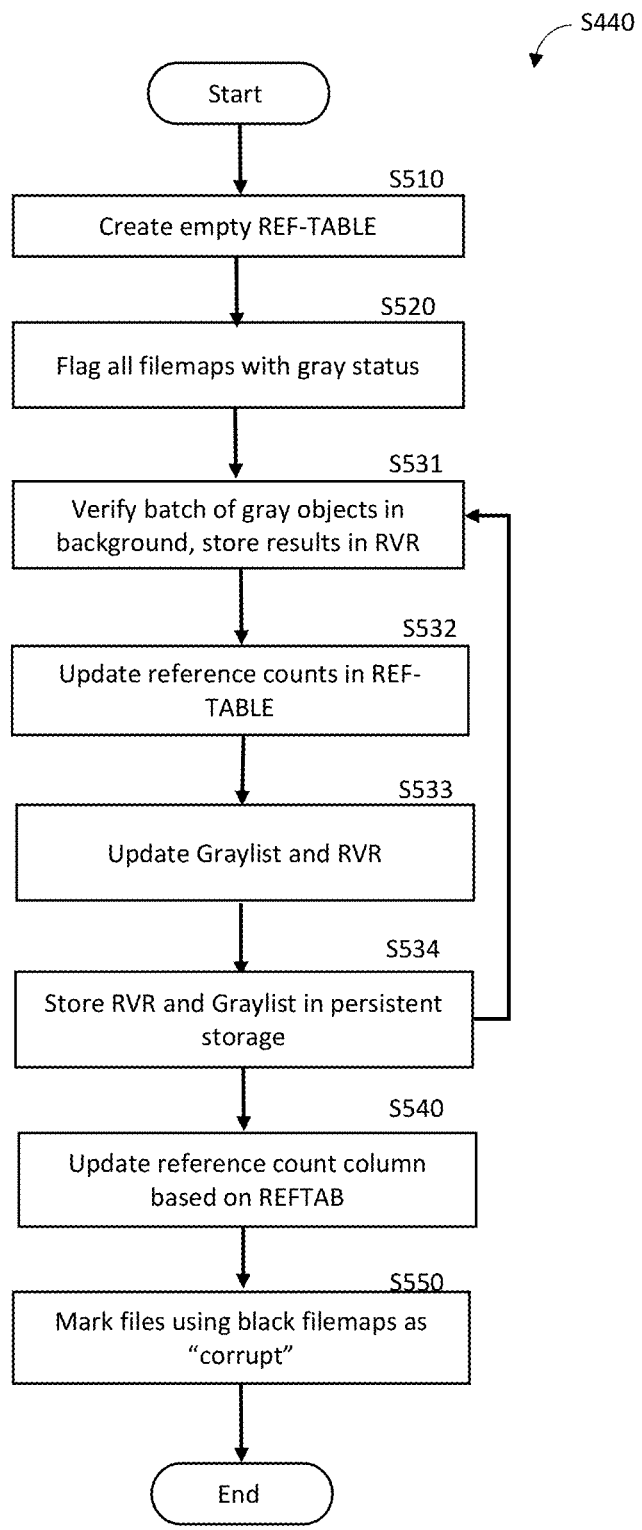
FIG. 5 is a flowchart illustrating a filemaps verification process according to another embodiment.

Referring now to FIG. 5, where at S510, a temporary table (hereinafter the "REF-TABLE") is created. The REF-TABLE is typically stored in the MDB 110 for recalculating the reference counts based on the filemap contents. The reference count of each object is equal to the number of file maps that point to the blocks. The REF-TABLE according to this embodiment includes the following fields: block ID, Oldref, and Newref. The block ID is the monotonically increasing block ID; the Oldref is a point in time snapshot of the Old Reference Count, i.e. a copy of the reference count of this block at the precise point in time when it was first added to the REF-TABLE; and Newref is the calculated reference count, which is initialized to 0 when the block is added to the REF-TABLE.

At S520, all filemaps to be verified are flagged with a gray status. At S531 through S534 all filemaps are iteratively verified. In this embodiment, if any filemap is found to be black, then each file pointed by a 'black filemap' is marked as a "corrupt file". Specifically, during each iteration, at S531, a batch of filemaps designated in the Graylist is checked, in the background, to determine if the filemaps contain a pointer to nonexistent or missing objects. At S532, the reference count in the REF-TABLE is updated to include the number of filemaps that points to a specific object. This count may be updated at every iteration as the filemaps are scanned.

At S533, every filemap being verified may be removed from the Graylist, and the verification results (e.g., White or Black) are kept in the RVR buffer. At S534, the Graylist and RVR are periodically saved into a persistent storage. The persistent storage may be at least one of: the MDB 110, one or more application servers 120, and a local cache at the servers 120.

At S540, the reference count column in, e.g., the blocks table stored in the MDB 110 is updated to include the count kept in the REF-TABLE. In an embodiment, the REF-TABLE may be integrated into the reference count column of the blocks table in the MDB 110.

It should be appreciated that, because the storage system is live during the scan, it is not possible to simply copy the reference counts table into that column, because the reference counts in the column may have changed due to files that were uploaded or deleted from the system during the verification process. Therefore, in order to take into account this concurrent system activity, the reference count of each block is updated as the sum of the current reference count (refcount) and the difference between the new count (Newref) and the old count (Oldref). That is, $$refcount=refcount+(Newref-Oldref)$$

It should be noted that some cloud storage systems may organize files in multiple independent deduplication groups. In such cases, each deduplication group may be handled separately.

At S550, all files pointed by filemaps that are marked using, e.g., black flags during the scan are designated as 'corrupted'. At the conclusion of S550, the column of the reference count is updated and the status of all filemaps in the MDB is verified (i.e., all filemaps are either marked as, e.g., black or white).

It should be noted that updates of the reference counts as described with reference to FIG. 5 and in particular to the REF-TABLE discussed can be utilized to re-calculate the reference counts (FIG. 2, S230). In an embodiment, the recalculating of the reference counts can be performed using two tables. Specifically, a first table includes at least a current reference count of each block being updated by the foreground process. The second table includes at least an updated reference count of blocks referenced by files encounter during a file scan and being updated by the background process. The reference count of each block is recalculated, once the scan is completed, using the block's respective count in the first and second tables.

According to another embodiment, the scanning performed at S210 synchronously verifies all the gray blocks (i.e. blocks in the Graylist), prior to returning the list of missing block IDs to the client. This verification process occurs in the application server 120 in real-time, while it is actively responding to requests from a specific device. As a result, the CSS 100 can operate normally and without potential for data corruption, though at a reduced throughput.

The synchronous verification may have shared memory with the background scanner process to access recent verification results in the RVR. Thus, verification of recently verified blocks may not need to be performed.

In another embodiment, when a gray block is encountered during the synchronous verification, an application server 120 speculatively behaves as if the block is white, and responds to the client 140 that the CSS 110 does have such a block. Then, background verification as discussed above with respect to FIGS. 4 and 5 is scheduled for blocks requested by the clients and having a gray status. When the client completes uploading the file, an application server 120 waits for all the block verification procedures to be completed, before acknowledging that the file has been stored successfully. If any of the blocks is found to be missing, invalid, or otherwise damaged, the server 120 instructs the client to retry sending the missing blocks.

In some cases, there may be gray blocks which are frequently accessed. In order to prevent excessive duplicate verifications of these gray blocks, a White/Black cache (WBC) may be used by an application server 120, which caches the block IDs of blocks recently discovered to be white or black as part of the synchronous path, along with their status. As in normal caches, WBC cache entries are discarded based on some strategy, such as most recently used (MRU) or least recently used (LRU). However, it should be appreciated that once a block ID of a block is removed from the Graylist, the respective block ID can also be immediately discarded from the WBC. Therefore, every time that an updated Graylist is received, any block IDs not in the Graylist are discarded from the WBC, thereby reducing the memory requirements of the WBC and preserving more cache space for other blocks. In an embodiment, the cache is efficiently implemented based on a red-black tree data structure.

As mentioned earlier, the scanning for orphan objects is performed when the CSS is fully operational. The optimized orphan scanning process disclosed herein takes advantage of a modified technique for storing objects in the object storage system 130. This technique is described in greater detail with reference to FIG. 6, while the optimized orphan scanning process is disclosed in FIG. 7.

Figure 6:
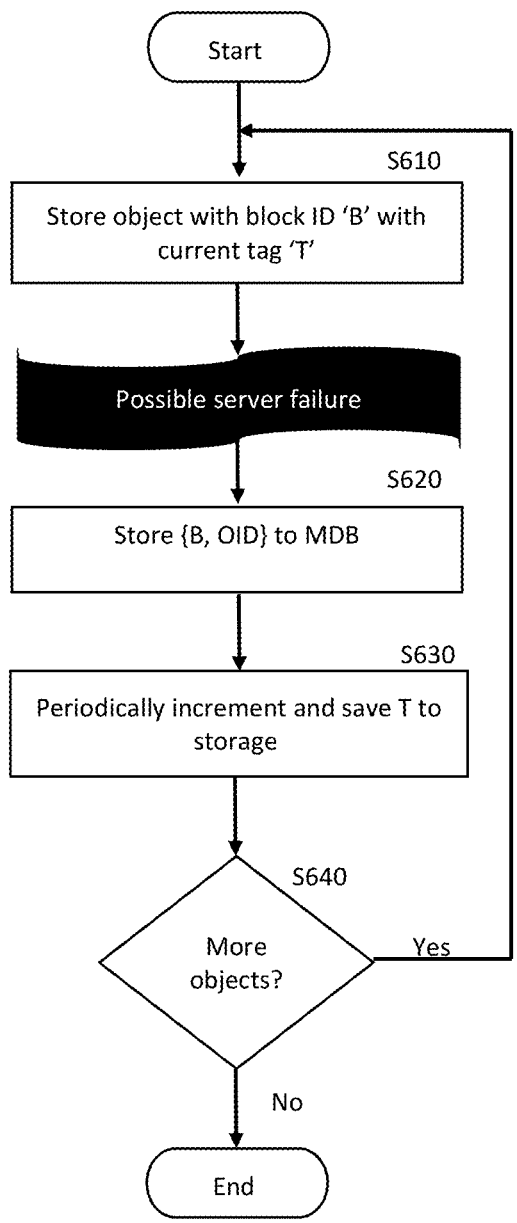
FIG. 6 is a flowchart illustrating a write operation of an object to an object storage system process according to another embodiment.

Referring now to FIG. 6. Typically, in order to store an object, e.g., a data block, the following takes place: a) the object is saved with the block ID "B" to storage system 130; b) the storage system replies with the respective OID; and c) the pair {B, OID} is stored in the MDB 110.

The server 120 can experience a failure between when the object being saved and the pair being stored, which prevents storing the OID in the MDB. As a result, at least one orphaned object exists in the storage system 130 which would never be cleaned by regular cleaner processes. The optimized orphan scanning process is designed to quickly detect and repair such orphaned objects.

According to various embodiments disclosed herein, at S610, an object with a block ID 'B' is stored together with a tag 'T'. The tag includes at least a unique ID of the application server 120 and a monotonically increased sequence number which is changed periodically (e.g., once every hour). For example, the initial tag of a server with ID "100" may be "100/1". When the tag is incremented, it receives the value "100/2", and so on. Tags may be stored in the object metadata section or a container, such as a bucket, directory, or folder, in which the objects are stored in the object storage system 130.

At S620, upon reception the OID respective of the stored object, the pair {B, OID} is saved in the MDB 110. At S630, periodically, the current tag value T is incremented and saved to a persistent storage. In S640, a check is made if there are additional objects for storage, and if so execution continues with S610; otherwise, execution terminates.

It should be appreciated that in an event of a server failure (between S610 and S620), all the objects which became orphans as result of such failure, hold a tag value of T or higher (where T is the last persisted value).

Figure 7:
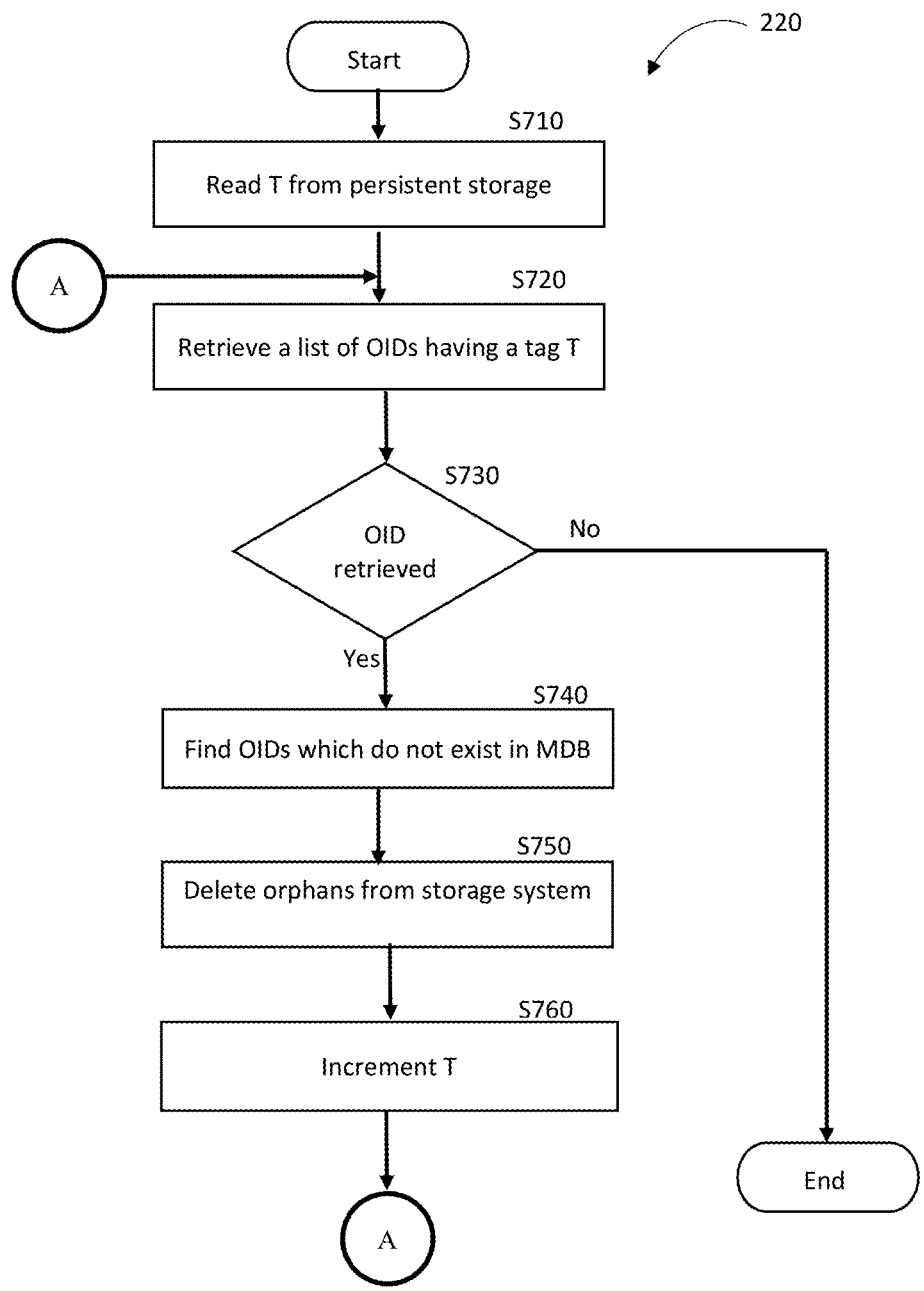
FIG. 7 is a flowchart illustrating a scanning process for orphan objects according to another embodiment.

FIG. 7 shows an exemplary and non-limiting flowchart S220 for an optimized orphan scanning process according to one embodiment. This process utilizes the tag values to scan for orphan objects typically upon recovery from a failure.

At S710, the current tag value T is read from a persistent storage. At S720, a list of OIDs, each OID having a tag value T, is retrieved from the cloud storage system 130. At S730, it is checked if at least one OID has been retrieved and, if so, execution continues with S740; otherwise, execution terminates.

At S740, the retrieved OIDs are matched to the OIDs included as part of the metadata and saved in a storage (e.g., the MDB 110). At S750, OIDs that are not found in the storage are declared as orphan objects and their respective objects are deleted from the CSS. At S760, the tag value T is incremented, and then execution returns to S720.

In one embodiment, the MDB may be connected to one or more cloud connectors and the scanning and reconciling processes described in greater detail below can performed by the cloud connectors.

Figure 8:
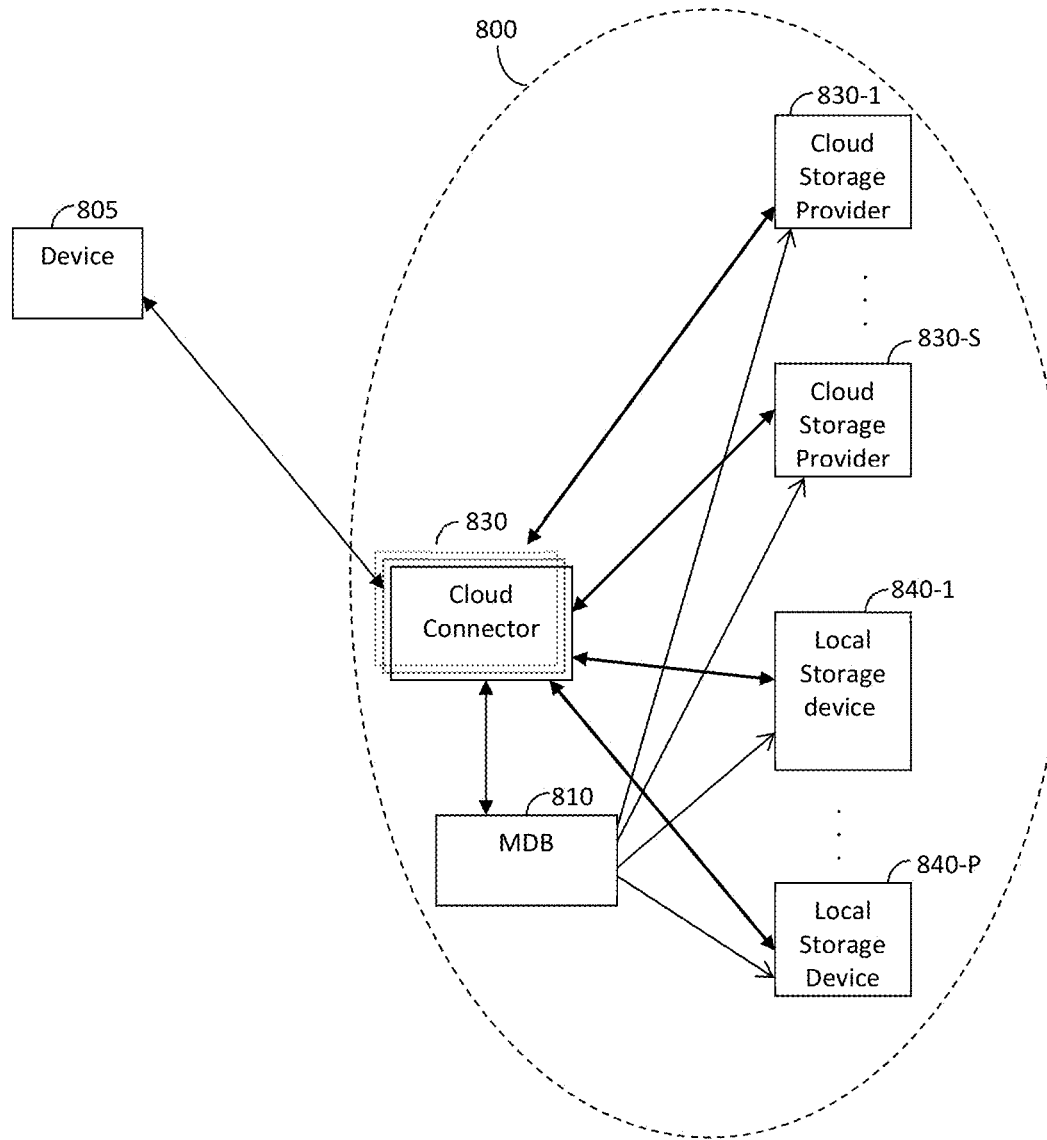
FIG. 8 is a diagram of a CSS that includes a plurality of cloud connectors configured to perform the disclosed MDB re-synchronization process.

As illustrated in the exemplary and non-limiting FIG. 8, a CSS 800 includes a plurality of cloud connectors 830 that facilitate connections between a cloud enabled storage device 805 and local storage devices 840-1 to 840-P (e.g., disk drives and/or SAN/NAS devices), local object storage systems, such as EMC Atmos or OpenStack, as well as connections to public cloud storage providers 830-1 through 830-S (e.g., Amazon® Web Services, IBM SmartCloud®, etc.). According to this embodiment, the MDB 810 is communicatively connected to the cloud connectors 830. In another embodiment, the CSS 800 may further include local object storage systems, such as EMC Atmos or OpenStack (not shown).

The cloud connectors 830 operate in parallel to enable load balancing and to avoid a single point of failure. The device 805 is a cloud-enabled storage device that is integrated with cloud storage services. The device 805 and each of the cloud connectors 830 implements a cloud transport protocol (CTP) to synchronize file contents between the device 805 and the CSS.

The cloud-enabled device 805, cloud connectors 830, and the CTP are further described in a Co-Pending patent application Ser. No. 12/641,559 referenced above.

According to one embodiment, the reconciliation processes of the MDB 810 may be triggered by one of the cloud connectors 830, to ensure data persistency between the cloud storage providers and the device 820. In another embodiment, the cloud connectors 830 communicate with the scanner that performs the MDB reconciliation techniques discussed in greater detail above. In other embodiments, the cloud connectors 830 are configured to perform MDB reconciliation.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for reconciling metadata and data in a cloud storage system while the cloud storage system is fully operational, the cloud storage system being communicatively coupled to at least an object storage system, in which stored blocks of data are associated as objects, comprising:

scanning a metadata database containing respective metadata for each of the blocks stored in the cloud storage system for broken references which are blocks that are designated in the metadata stored in the metadata database, but that do not exist in the object storage system, wherein the scanning for the broken references is performed as a background process of the cloud storage system; and synchronously verifying blocks for at least existence of the blocks in the object storage system, wherein the synchronous block verification is performed using a foreground process of the cloud storage system in real time as blocks are requested therefrom.

2. The method of claim 1, further comprising:
scanning the cloud storage system to detect orphan objects, wherein scanning for the orphan objects is also performed as a background process.

3. The method of claim 2, further comprising:
recalculating reference counts of objects referenced in the metadata database, wherein the recalculating is performed as a background process.

4. The method of claim 1, wherein scanning for the broken references further comprises:
flagging at least a subset of blocks referenced in the metadata database as in need of verification;
performing a block verification process to verify correctness of each block flagged as requiring verification;
flagging each block that passes the block verification process as valid; and
flagging each block that fails the block verification process as missing.

5. The method of claim 4, wherein the block verification process further comprises:
reading from the object storage system at least one out of the subset of objects requiring verification;
computing a hash value for each read object; and
matching the computed hash value to a respective value stored in the metadata database, wherein an object is verified when the hash values match.

6. The method of claim 5, wherein block IDs of the subset of objects requiring block verification are designated in a Graylist, wherein the Graylist further includes any one of: a single scalar value of a highest block ID known to be unverified, and a set of block ID ranges of the subset of objects.

7. The method of claim 6, wherein synchronously verifying the blocks further comprising:
verifying blocks designated in the Graylist according to their respective block IDs, wherein block IDs not designated in the Graylist are considered verified.

8. The method of claim 4, wherein scanning for the broken references further comprises:
determining if there is at least one pointer to at least one block which references a non-existing object in the object storage system.

9. The method of claim 2, wherein scanning to detect the orphan objects further comprises:
retrieving a list of object IDs from the object storage system; and
matching objects IDs of the retrieved list of object IDs to respective object IDs included in the metadata saved in the metadata database, wherein objects of object IDs that are not found in the metadata database are declared as orphan objects.

10. The method of claim 2, further comprising:
deleting detected orphan objects from the object storage system.

11. The method of claim 9, wherein retrieving the list of object IDs from the object storage system further comprises:
reading a current tag value from persistent storage, wherein a tag value comprises at least a monotonically increased sequence number; and
retrieving the list of object IDs having a tag value greater or equal to the current tag value.

12. The method of claim 3, wherein recalculating the reference counts further comprises:
providing a first table that includes at least a current reference count of each block, wherein the first table is updated by a foreground process of the cloud storage system;
providing a second table that includes at least an updated reference count of blocks referenced by files encounter during a file scan, wherein the second table is updated by the background process;
upon completion of the file scan, providing a recalculated reference count for each block based on its respective count in the first and second tables.

13. The method of claim 1, further comprising:
receiving a status query for a block from a client;
checking if the block is flagged as requiring verification;
responding that the block is not missing, when the block is flagged as requiring verification;
completing the block verification process of the block; and
responding to the client with a request to resend the block when the block verification process of the block fails.

14. The method of claim 2, further comprising:
receiving a status query for a block from a client;
checking if the block is flagged as requiring verification;
starting the block verification process of the block, when the block is flagged as requiring verification;
delaying a response to the status query until a client transaction is ended; and
responding with a request to resend the block when the block verification process of the block fails.

15. The method of claim 1, wherein the cloud storage services (CSS) is configured to provide mass storage to a client via a web service interface.

16. A non-transitory computer readable medium having stored thereon instructions for causing one or more processing units to execute the method according to claim 1.

17. A system for reconciling metadata and data in a cloud storage system, while the cloud storage system is fully operational, the cloud storage system being communicatively coupled to at least an object storage system, in which stored blocks of data are associated as objects, comprising:
a processor communicatively connected to a resource storage; and
a memory coupled to the processor, wherein the memory contains instructions that, when executed by the processor, configure the system to:
scan in a metadata database containing respective metadata for each of blocks stored in the cloud storage system for broken references which are blocks that are designated in the metadata stored in the metadata database, but that do not exist in the object storage system, wherein the scanning for the broken references is performed as a background process of the cloud storage system; and
synchronously verify blocks for at least existence of the blocks in an object storage system, wherein the synchronous block verification is performed using a foreground process of the cloud storage system in real time as blocks are requested.

18. The system of claim 17, wherein the system is further configured to: scan the cloud storage system to detect orphan objects, wherein scanning for the orphan objects is also performed as a background process.

19. The system of claim 17, wherein the system is further configured to:

recalculate reference counts of objects referenced in the metadata database, wherein the recalculating for the reference counts is performed as a background process.

20. The system of claim 17, wherein the system is further configured to:
flag at least subset of blocks referenced in the metadata database as requiring verification;
perform a block verification process to verify correctness of each block flagged as requiring verification;
flag each block that passes the block verification process as valid; and
flag each block that fails the block verification process as missing.

21. The system of claim 17, wherein the system is further configured to:
read one or more objects out of the subset of objects from the object storage system;
compute a hash value for each read object; and
match the computed hash value to a respective value stored in the metadata database, wherein an object is verified when the hash values match.

22. The system of claim 21, wherein block IDs of the subset of objects required block verification are designated in a Graylist, wherein the Graylist further includes any one of: a single scalar value of a highest block ID known to be unverified, and a set of block ID ranges of the subset of objects.

23. The system of claim 22, wherein synchronously verifying the blocks further comprising:
verify blocks designated in the Graylist according to their respective block IDs, wherein block IDs not designed in the Graylist are considered verified.

24. The system of claim 19, wherein the system is further configured to:
determine if there is at least one pointer to at least one block which references a non-existing object in the object storage system.

25. The system of claim 18, wherein the system is further configured to:
retrieve a list of object IDs from the object storage system; and
match the retrieved object IDs to respective object IDs included in the metadata saved in the metadata database, wherein objects of object IDs that are not found in the metadata database are declared as orphan objects.

26. The system of claim 18, wherein the system is further configured to:
delete detected orphan objects from the object storage system.

27. The system of claim 25, wherein the system is further configured to:
read a current tag value from persistent storage, wherein a tag value comprises at least a monotonically increased sequence number; and
retrieve the list of object IDs having a tag value greater or equal to the current tag value.

28. The system of claim 19, wherein the system is further configured to:
provide a first table that includes at least a current reference count of each block, wherein the first table is updated by a foreground process of the cloud storage system;
provide a second table that includes at least an updated reference count of blocks referenced by files encounter during a file scan, wherein the second table is updated by the background process;
upon completion of the file scan, provide a recalculated reference count for each block based on its respective count in the first and second tables.

29. The system of claim 17, wherein the system is further configured to:
receive a status query for a block from a client;
check if the block is flagged as requiring verification;
respond that the block is not missing, when the block is flagged as requiring verification;
complete the block verification process of the block; and
respond to the client with a request to resend the block when the block verification process of the block fails.

30. The system of claim 17, wherein the system is further configured to:
receive a status query for a block from a client;
check if the block is flagged as requiring verification;
start the block verification process of the block, when the block is flagged as required verification;
delay a response to the status query until a client transaction is ended;
respond with a request to resend the block when the block verification process of the block fails.

31. The system of claim 17, wherein the cloud storage services (CSS) is configured to provide mass storage to a client via a web service interface.

32. A method for reconciling metadata and data in a cloud storage system, while the cloud storage system is fully operational, the cloud storage system being communicatively coupled to at least an object storage system, in which stored blocks of data are associated as objects, comprising:
scanning the cloud storage system for orphan objects, each orphan object being an object of a respective data block saved in the object storage system but not having in a metadata database containing the metadata at least one of corresponding metadata and a corresponding pointer, wherein scanning for the orphan objects is performed as a background process; and
synchronously verifying blocks for at least existence of the blocks in an object storage system, wherein the synchronous block verification is performed using a foreground process of the cloud storage system in real time as blocks are requested.

33. A method for reconciling metadata and data in a cloud storage system, while the cloud storage system is fully operational, the cloud storage system being communicatively coupled to at least an object storage system, in which stored blocks of data are associated as objects, comprising:
recalculating reference counts of objects referenced in a metadata database containing the metadata, a reference count being a parameter that maintains a number of file maps which reference a data block, each data block having its own reference count value stored in the metadata database, wherein recalculating for the reference counts is performed as a background process of the cloud storage system; and
synchronously verifying blocks for at least existence of the blocks in the object storage system, wherein the synchronous block verification is performed using a foreground process of the cloud storage system in real time as blocks are requested.

* * * * *